UNITED STATES PATENT OFFICE 2,572,852

INSECT REPELLENTS

Marshall Gates, Bryn Mawr, Pa., assignor to the United States of America as represented by the Secretary of the Army No Drawing. Application January 10, 1949,
Serial No. 70,136

6 Claims. (Cl. 167—22)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to insect repellents.

I have found that the application of a lower alkyl ester of an alpha-oximino-substituted fatty acid of the general formula $$A-\underset{\underset{NOH}{\|}}{C}-COOH$$

wherein A is selected from acyl and alkyl groups having an open chain of from 1 to 4 carbon atoms, to the human skin or to a fabric affords effective protection against insect bites by repelling insects, particularly Aedes Aegypti and Anopheles quadrimaculatus.

A number of tests to measure the repellency of these compounds against Aedes Aegypti was conducted by smearing the compound on the arms of test personnel, who then thrust their arms into cages containing Aedes Aegypti. The arms were exposed for 30-minute intervals at 3 minutes each until the first insect bite.

Tests to measure the repellency against Aedes Aegypti of fabrics impregnated with these compounds were conducted by uniformly impregnating mercerized cotton hose with the compound at a rate equivalent to 3.3 gms. per sq. ft., drawing the dried hose over the arms of test personnel, who then thrust their covered arms into cages containing Aedes Aegypti for 1 to 2 minutes. If no bites or less than 5 bites were received, the tests were repeated each successive day until 5 or more bites during one exposure were received.

Examples of alpha-oximino-substituted fatty acids whose lower alkyl esters possess insect repellent properties are acetyl - alpha - oximino-acetic acid and alpha-oximino-iso-caproic acid; examples of suitable esters are the methyl, ethyl and propyl esters of such acids.

The following table illustrates the insect repellency conferred by two typical compounds contemplated by my invention:

| | | Repellency on application to skin | | Repellency of impregnated fabric against Aedes Aegypti |
|---|---|---|---|---|
| | | Aedes Aegypti | Anopheles Quadrimaculatus | |
| | | Min. | Min. | |
| a | Ethyl ester of acetyl-alpha-oximino-acetic acid. | 210 | 54 | over 5 days. |
| b | Ethyl ester of alpha-oximino-iso-caproic acid. | 241 | 46 | over 10 days. |

For ease of application to the skin, the compounds may be incorporated in a suitable inert liquid or solid carrier such as mineral oil, alcohol, petrolatum, etc. For ease and uniformity of application to the fabric, the compounds may be applied to the fabric in an inert solvent, such as alcohol, ether, etc.

Having thus described my invention, I claim:

1. A process of repelling insects, comprising applying a lower alkyl ester of an acyl-substituted alpha-oximino-acetic acid to the region from which the insects are to be repelled.

2. A process of repelling insects, comprising applying a lower alkyl ester of an acyl-substituted alpha-oximino-acetic acid to the skin.

3. A process of repelling insects, comprising applying the ethyl ester of acetyl alpha-oximino-acetic acid to the region from which the insects are to be repelled.

4. A process of repelling insects, comprising applying the ethyl ester of acetyl alpha-oximino-acetic acid to the skin.

5. An insect repellent composition comprising a lower alkyl ester of an acyl-substituted alpha-oximino-acetic acid in an inert non-gaseous organic carrier, said carrier being a member of the group consisting of oil and petrolatum.

6. An insect repellent composition comprising the ethyl ester of acetyl alpha-oximino-acetic acid in an inert non-gaseous organic carrier, said carrier being a member of the group consisting of oil and petrolatum.

MARSHALL GATES.

REFERENCES CITED

The following references are of record in the file of this patent:

UNITED STATES PATENTS

| Number | Name | Date |
|---|---|---|
| 2,305,558 | Roblin et al. | Dec. 15, 1942 |

OTHER REFERENCES

OSRD, Com. on Med. Res., Bimonthly Progress, Report No. 24, sec. 1, period ending June 30, 1945; particularly pages 2 and 3. Orlando No. 0–11159, Ethyl alpha-oximino isocaproate.

Beilstein, "Handbuch d. Org. Chem.," 4th ed., vol. 3, pp. 744, 745.